(12) United States Patent
Abe

(10) Patent No.: US 6,216,385 B1
(45) Date of Patent: Apr. 17, 2001

(54) RADIO CALLING RECEIVER WITH MEANS TO CONTROL RECEPTION BASED ON SERVICE AREA, TIME ZONE, AND/OR ELECTRIC FIELD STRENGTH

(75) Inventor: Yasushi Abe, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/151,818

(22) Filed: Sep. 14, 1998

(30) Foreign Application Priority Data

Sep. 22, 1997 (JP) .................................................. 9-256521

(51) Int. Cl.[7] ...................................................... H04Q 7/00
(52) U.S. Cl. ......................... 45/31.1; 455/32.1; 455/458; 340/825.44
(58) Field of Search .................................. 455/343, 38.1, 455/38.3, 32.1, 458, 228, 229, 421; 340/825.44

(56) References Cited

U.S. PATENT DOCUMENTS

| | | | |
|---|---|---|---|
| 4,839,639 | * | 6/1989 | Sato et al. ........................ 340/825.44 |
| 4,974,251 | * | 11/1990 | Ohta et al. ............................... 379/61 |
| 5,144,296 | * | 9/1992 | DeLuca et al. .................. 340/825.44 |
| 5,297,203 | * | 3/1994 | Rose et al. ............................. 455/421 |
| 5,847,657 | * | 12/1998 | Tsuchiyama .......................... 455/421 |
| 5,873,024 | * | 2/1999 | Suzuki ................................. 455/38.3 |
| 5,987,334 | * | 11/1999 | Kaku .................................... 455/552 |
| 6,029,061 | * | 2/2000 | Kohlschmidt ........................ 455/343 |

* cited by examiner

Primary Examiner—Edward F. Urban
Assistant Examiner—Tilahun Gesesse
(74) Attorney, Agent, or Firm—Pearne & Gordon LLP

(57) ABSTRACT

A receiving frame controlling unit 4a for controlling receiving operations of a plurality of frames individually, and a receiving state detecting unit 1b for detecting whether or not a receiving state is in or out of a service area of the base station are provided in a CPU 4, wherein the power saving or conservation can be achieved in the out of the service area status by halting frame receiving operations when the receiving state is out of the service area. Also, according to an error rate of received radio information, or according to a time zone which is set arbitrarily to particular information broadcasting addresses by a user, the power saving or conservation may be achieved by reducing the number of receiving frames. Further, if the receiving state is out of the service area and also the electric field strength is low, the power saving or conservation may be achieved by executing a short-time standby operation to monitor only the electric field state.

7 Claims, 13 Drawing Sheets

RADIO CALLING RECEIVER WITH MEANS TO CONTROL RECEPTION BASED ON SERVICE AREA, TIME ZONE, AND/OR ELECTRIC FIELD STRENGTH

BACKGROUND OF THE INVENTION

The present invention relates to a radio calling receiver for calling and displaying messages or information corresponding to data contained in a radio signal which is transmitted from a base station of a radio calling system.

FIG. 13 is a block circuit diagram showing a circuit configuration of a radio calling receiver in the prior art. In FIG. 13, a reference 21 denotes a receiver portion for receiving a radio signal transmitted from a base station of a radio calling system through an antenna 21a and then demodulating the radio signal into a digital signal; 22, a decoder for executing a bit synchronization and error correction process of the received signal being converted into the digital signal and then collating an address contained in the received signal with an own address stored in a memory 23; 23, a memory having a memory device, e.g., an EEPROM (Electrically Erasable Programmable Read Only Memory) into which data can be electrically erased and written, and for storing the own address of the radio calling receiver; and 24, a CPU (Central Processing Unit) for controlling peripheral circuits based on the received signal transmitted from the decoder 22. A reference 25 denotes a display driver for driving a display 26 based on a display signal supplied from the CPU 24; 26, a display for displaying the messages in response to the display signal by using a liquid crystal display device when it is driven by the display driver 25; and 27, a switch for generating commands and various data corresponding to an operation instructed by a user. A signal output from the switch 27 is input into the CPU 24 via the decoder 22. A reference 28 denotes a speaker driver for generating a ringer tone by sounding a ringing speaker 29, and a reference 30 denotes a vibrator driver for controlling vibrations of a vibrator 31.

Next, an operation of the above radio calling receiver will be explained hereunder. The receiver portion 21 first receives the radio signal transmitted from the base station of the radio calling system (referred to simply as the "base station" hereinafter) via the antenna 21a at a predetermined timing controlled by the CPU 24, then converts this received radio signal into the digital signal via amplification, frequency-conversion, detection, and demodulation processes, and then sends out the digital signal to the decoder 22. Then, the decoder 22 executes the bit synchronization and error correction process of the digital signal received from the receiver portion 21, then collates the address contained in the received signal with the own address read out from the memory 23 via the CPU 24, and then decides whether or not the received signal is directed to own radio calling receiver.

If the received signal is directed to the own radio calling receiver and message data are contained in the received signal, the decoder 22 fetches the message data from the received signal, then sends out the message data to the CPU 24, and then outputs a drive signal to the speaker driver 28 or the vibrator driver 30. The speaker driver 28 generates the ringer tone by driving the ringing speaker 29 in answer to inputting of the drive signal. Otherwise, if the radio calling receiver is set into a calling operation for the vibrator 31 in advance, it can output the drive signal only to the vibrator driver 30 to cause the vibrator 31 to vibrate. In parallel to this calling operation, the CPU 24 converts the message data into a display signal, which is composed of an assembly of predetermined bit number of bit codes, and then sends out the display signal to the display driver 25. Then, the display driver 25 displays predetermined messages corresponding to the message data on the display 26 by driving the display 26 based on the display signal sent out from the CPU 24.

In this manner, the conventional radio calling receiver can receive the radio signal transmitted from the base station, then execute the ringing operation by using the ringer tone and then display the messages contained in the radio signal by use of characters.

However, in the above-mentioned conventional radio calling receiver, in the event that normal individual calling messages and information broadcasting messages which can broadcast information such as news, weather forecast, for example, are to be received by using separate receiving frames, a receiving operation for individual calling and a receiving operation for information broadcasting must be repeated at constant cycles respectively. For this reason, the radio calling receiver in the prior art has had such a problem that, the number of the receiving operation per a constant time is increased rather than the case where only the receiving frame for individual calling is to be received, so that the radio calling receiver must repeat receiving operations which are disadvantageous for battery lifetime.

SUMMARY OF THE INVENTION

The present invention has been made to overcome the above problems, and it is an object of the present invention to provide a radio calling receiver which is capable of achieving power saving or conservation by controlling its receiving operation when messages are just received by using a plurality of own frames such as individual calling frame, information broadcasting frame.

In order to achieve the above object, in the radio calling receiver which is able to receive radio signals transmitted to a plurality of own addresses as a plurality of different own frames respectively, according to whether or not a receiving state is in or out of a service area of a base station, or according to an error rate of received radio information, or according to whether or not a current time belongs to a time zone which is arbitrarily set to particular information broadcasting addresses by a user, the present invention can reduce the number of received frames to achieve power saving or conservation respectively. In addition, in case of the receiving state is out of a service area of the base station, a standby operation is executed when the electric field strength exceeds a predetermined value, so that the radio calling receiver of the present invention can also achieve the power saving or conservation.

A radio calling receiver according to the present invention comprises: a receiving means for receiving radio signals transmitted to a plurality of own addresses from a base station of a radio calling system as a plurality of different own frames respectively; a decoding means for fetching one or a plurality of own addresses from the radio signals received and then fetching message data corresponding to the own addresses; a receiving frame controlling means for controlling individually receiving operations of a plurality of frames; and a receiving state detecting means for detecting whether or not a receiving state is in or out of a service area of the base station; wherein receiving operations in all own frames corresponding to the plurality of own addresses can be executed if the receiving state is in the service area, and receiving operations only in own frames corresponding to individual calling addresses can be executed if the receiving state is out of the service area, whereby reception of own frames such as information broadcasting frames which need a low real-time response can be halted. As a result, the above invention has such an advantage that, if messages are to be received as a plurality of frames for individual calling, information broadcasting, etc., the power saving or conservation can be achieved by reducing the number of receiving frames when the receiving state is out of the service area of the base station.

Further, a radio calling receiver according to the present invention comprises: a receiving means for receiving radio signals transmitted to a plurality of own addresses from a base station of a radio calling system as a plurality of different own frames respectively; a decoding means for fetching one or a plurality of own addresses from the radio signals received and then fetching message data corresponding to the own addresses; a receiving frame controlling means for controlling individually receiving operations of a plurality of frames; and an error rate deciding means for deciding an error rate of the radio signals; wherein receiving operations in all own frames corresponding to the plurality of own addresses can be executed if the error rate is within a certain range, and receiving operations only in own frames corresponding to individual calling addresses can be executed if the error rate is in excess of the certain range, whereby reception of own frames such as information broadcasting frames which need a low real-time response can be halted. As a result, the above invention has such an advantage that, if the messages are to be received as a plurality of frames for individual calling, information broadcasting, etc., the power saving or conservation can be achieved by reducing the number of receiving frames in the areas wherein receiving state is poor.

Furthermore, a radio calling receiver according to the present invention comprises: a receiving means for receiving radio signals transmitted to a plurality of own addresses from a base station of a radio calling system as a plurality of different own frames respectively; a decoding means for fetching one or a plurality of own addresses from the radio signals received and then fetching message data corresponding to the own addresses; a receiving frame controlling means for controlling individually receiving operations of a plurality of frames; a receiving time setting means for setting an operation halting time zone of receiving frames corresponding to addresses designated by a user; and a receiving time deciding means for deciding whether or not a current time enters into the operation halting time zone; wherein receiving operations in all own frames corresponding to the plurality of own addresses can be executed in a usually available mode, and reception of own frames corresponding to designated addresses can be halted if the current time belongs to the operation halting time zone being set. As a result, the above invention has such an advantage that, if the messages are to be received as a plurality of frames for individual calling, information broadcasting, etc., the power saving or conservation can be achieved by halting or suspending the reducing the number of receiving frames when the receiving state is out of a service area of the base station.

Still further, a radio calling receiver comprises: a receiving means for receiving radio signals transmitted to a plurality of own addresses from a base station of a radio calling system as a plurality of different own frames respectively; a decoding means for fetching one or a plurality of own addresses from the radio signals received and then fetching message data corresponding to the own addresses; a receiving frame controlling means for controlling individually receiving operations of a plurality of frames; a receiving state detecting means for detecting whether or not a receiving state is in or out of a service area of the base station; an electric field strength detecting means for detecting an electric field value of a predetermined frequency to be received; and an electric field state deciding means for deciding an electric field state of the predetermined frequency to be received; wherein an electric field can be detected by the electric field strength detecting means if it has been decided by the receiving state detecting means that the receiving state is out of the service area status, and a standby operation which is shorter in time than a normal standby operation can be performed if it has been decided by the electric field state deciding means that the electric field strength is less than a certain value. As a result, the above invention has such an advantage that, if the messages are to be received as a plurality of frames for individual calling, information broadcasting, the power saving or conservation can be achieved by executing the short-time standby operation only to monitor the electric field state when the receiving state is out of a service area of the base station and also the electric field strength is low.

DETAILED DESCRIPTION OF THE PREFERRED EMBODIMENTS

Embodiments of the present invention will be explained in detail with reference to FIGS. 1 to 12 hereinafter.

Embodiment 1

Figure 1:
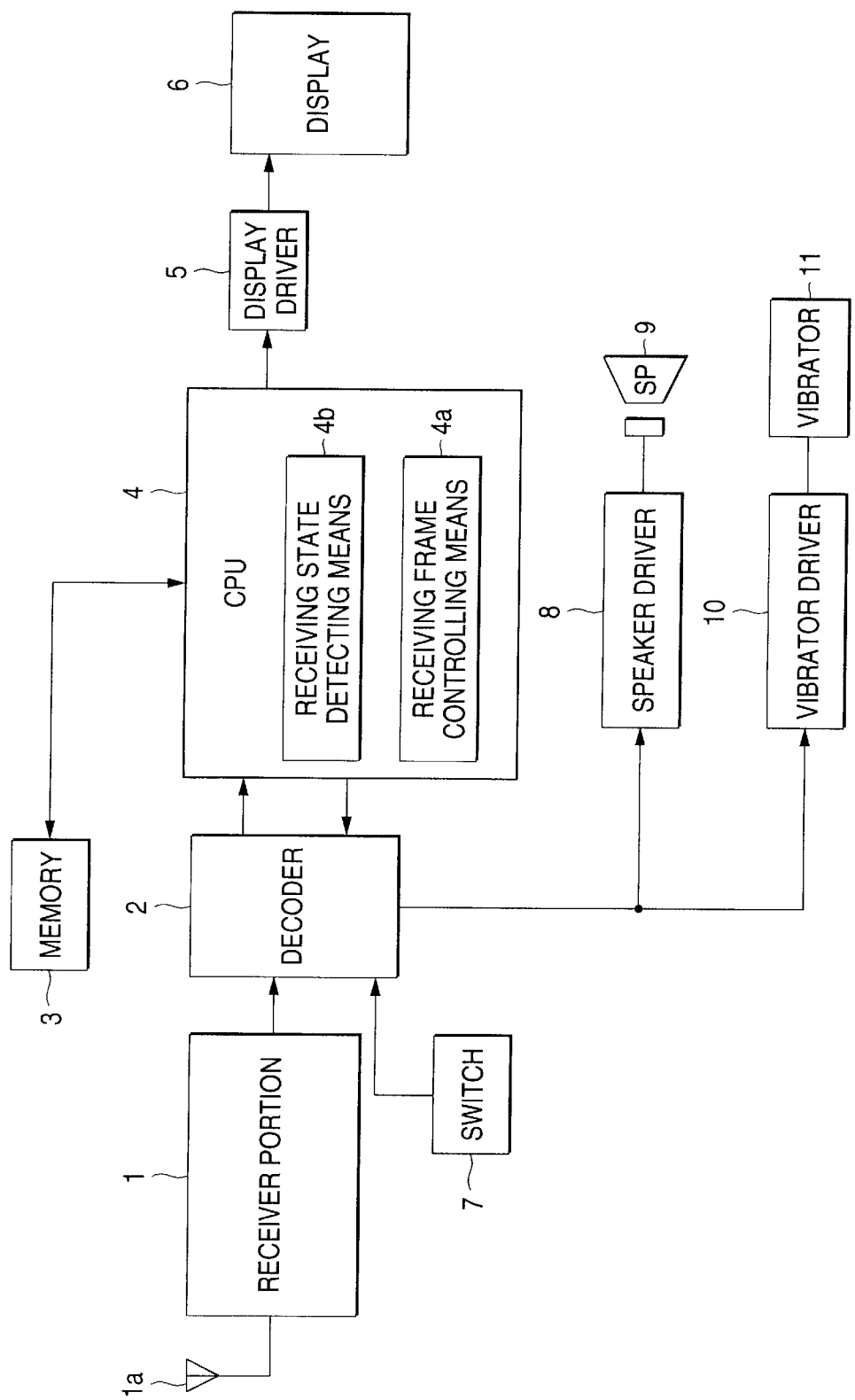
FIG. 1 is a block circuit diagram showing a circuit configuration of a radio calling receiver according to a first embodiment of the present invention.

FIG. 1 is a block circuit diagram showing a circuit configuration of a radio calling receiver according to a first embodiment of the present invention. In FIG. 1, a reference 1 denotes a receiver portion for receiving a radio signal transmitted from a base station of a radio calling system via an antenna 1*a*, and then demodulating the radio signal into a digital signal; 2, a decoder for executing a bit synchronization and error correction process of the received signal being converted into the digital signal, and then collating an address contained in the received signal with an own address stored in a memory 3; 3, a memory having a memory device, e.g., an EEPROM into which data can be erased and written electrically, and for storing the own address of the radio calling receiver; and 4, a CPU for controlling peripheral circuits based on the received signal transmitted from the decoder 2. A reference 5 denotes a display driver for driving a display 6 based on a display signal supplied from the CPU 4; 6, a display for displaying messages, etc. in response to the display signal by using a liquid crystal display device, etc. when it is driven by the display driver 5; and 7, a switch for generating commands and various data in correspondence to an operation instructed by a user. A signal output from the switch 7 is input into the CPU 4 via the decoder 2. A reference 8 denotes a speaker driver for generating a ringer tone by sounding a ringing speaker 9, and a reference 10 denotes a vibrator driver for controlling vibrations of a vibrator 11.

Next, an operation of the radio calling receiver according to the first embodiment will be explained hereunder. In the radio calling receiver, the receiver portion 1 first receives the radio signal transmitted from the base station via the antenna 1*a* at a predetermined timing controlled by the CPU 4, then converts this received signal into the digital signal via amplification, frequency-conversion, detection and demodulation processes, and then sends out the digital signal to the decoder 2. Then, the decoder 2 executes the bit synchronization and error correction process of the digital signal received from the receiver portion 1, then collates the address contained in the received signal with the own address read out from the memory 3 via the CPU 4, and then decides whether or not the received signal is directed to own radio calling receiver.

If the received signal is directed to the own radio calling receiver and message data are contained in the received signal, the decoder 2 fetches the message data from the received signal, then sends out the message data to the CPU 4 and outputs a drive signal to the speaker driver 8 or the vibrator driver 10. The speaker driver 8 generates the ringer tone by driving the ringing speaker 9 in answer to inputting of the drive signal. Otherwise, if the decoder 2 is set into a calling operation for the vibrator 11 previously, it can output the drive signal only to the vibrator driver 10 to cause the vibrator 11 to vibrate.

The CPU 4 includes a receiving frame controlling means 4*a* which can control the receiving operations in a plurality of own addresses registered in the memory 3 and a plurality of receiving frames in correspondence to the own addresses, and a receiving state detecting means 4*b* for deciding, based on data sent out from the decoder 2, whether or not the radio calling receiver is in or out of the service area of the base station according to the receiving condition of a synchronizing signal transmitted from the base station.

Figure 2:
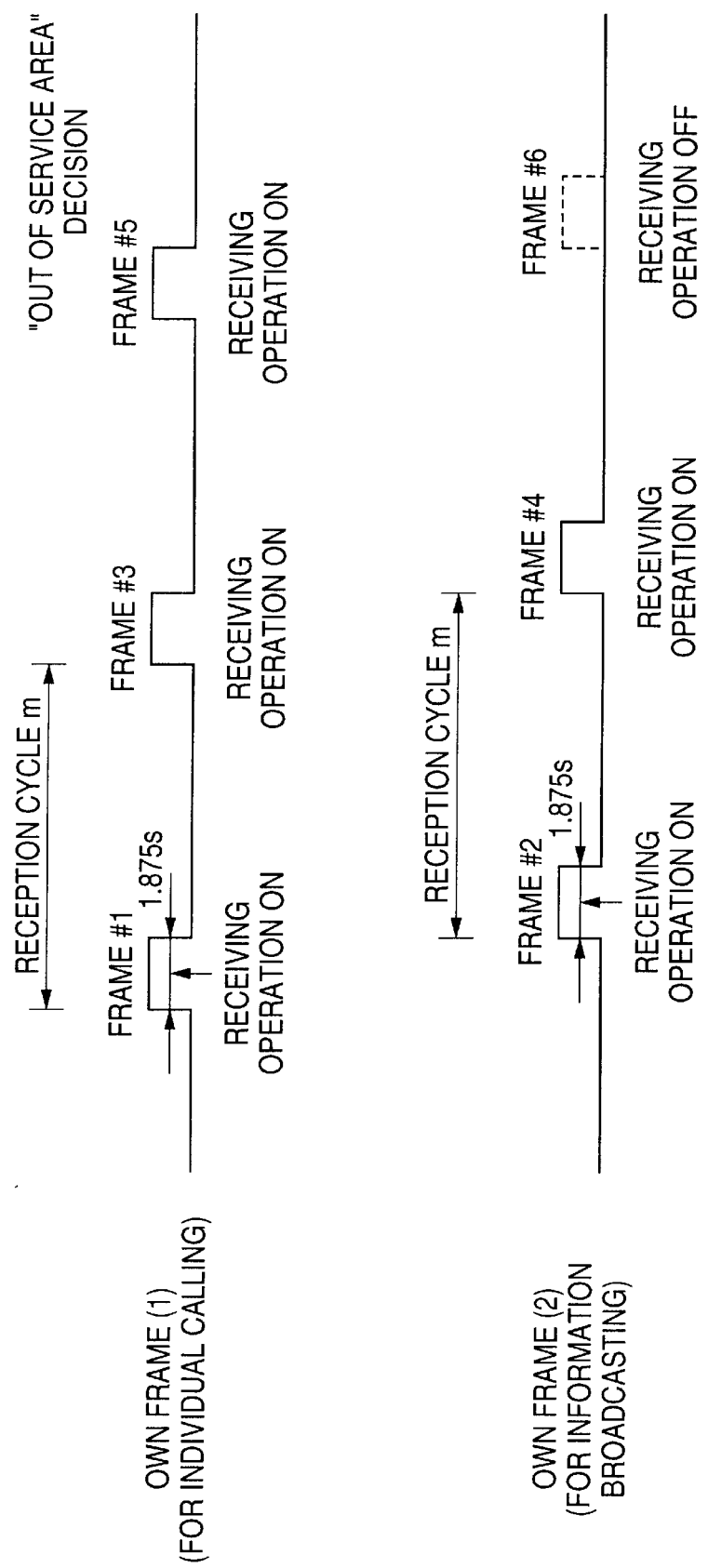
FIG. 2 is a timing chart showing receiving operations of the radio calling receiver according to the first embodiment of the present invention.

FIG. 2 is a timing chart showing receiving operations of the radio calling receiver according to the first embodiment when a plurality of frames are to be received. In FIG. 2, the case is illustrated where an own frame (1) is used in the receiving operation for individual calling and an own frame (2) is used in the receiving operation for information broadcasting. In the case of the signal system which is able to meet the advanced radio calling system standard RCR-STD43A, the transmission time is 1.875 seconds per frame and the number of frame is 128 frames per cycle, so that signals of 15 cycles can be sent out from the base station for one hour. Assume that the own frame (1) and the own frame (2) have different receiving frames respectively but they are operated in the same receiving cycle. Data for use in individual calling and data for use in information broadcasting are sent out in unit of frame respectively.

In FIG. 2, if the radio calling receiver is in the "in the service area" status, it can execute the receiving operations every time in accordance with a series of reception cycles in both the own frame (1) for individual calling and the own frame (2) for information broadcasting, as shown from the frame #1 to the frame #4 in FIG. 2. At the time of reception of the frame #5 in FIG. 2, if the receiving state detecting means 4*b* shown in FIG. 1 has detected that the radio calling receiver is out of the service area of the base station, the receiving frame controlling means 4*a* can halt or terminate the receiving operation, which is normally to be carried out when the radio calling receiver is in the service area of the base station, of the frame #6 in the own frame (2) in FIG. 2. As a result, the ineffective receiving operation can be omitted to thus achieve power saving or conservation.

Figure 3:
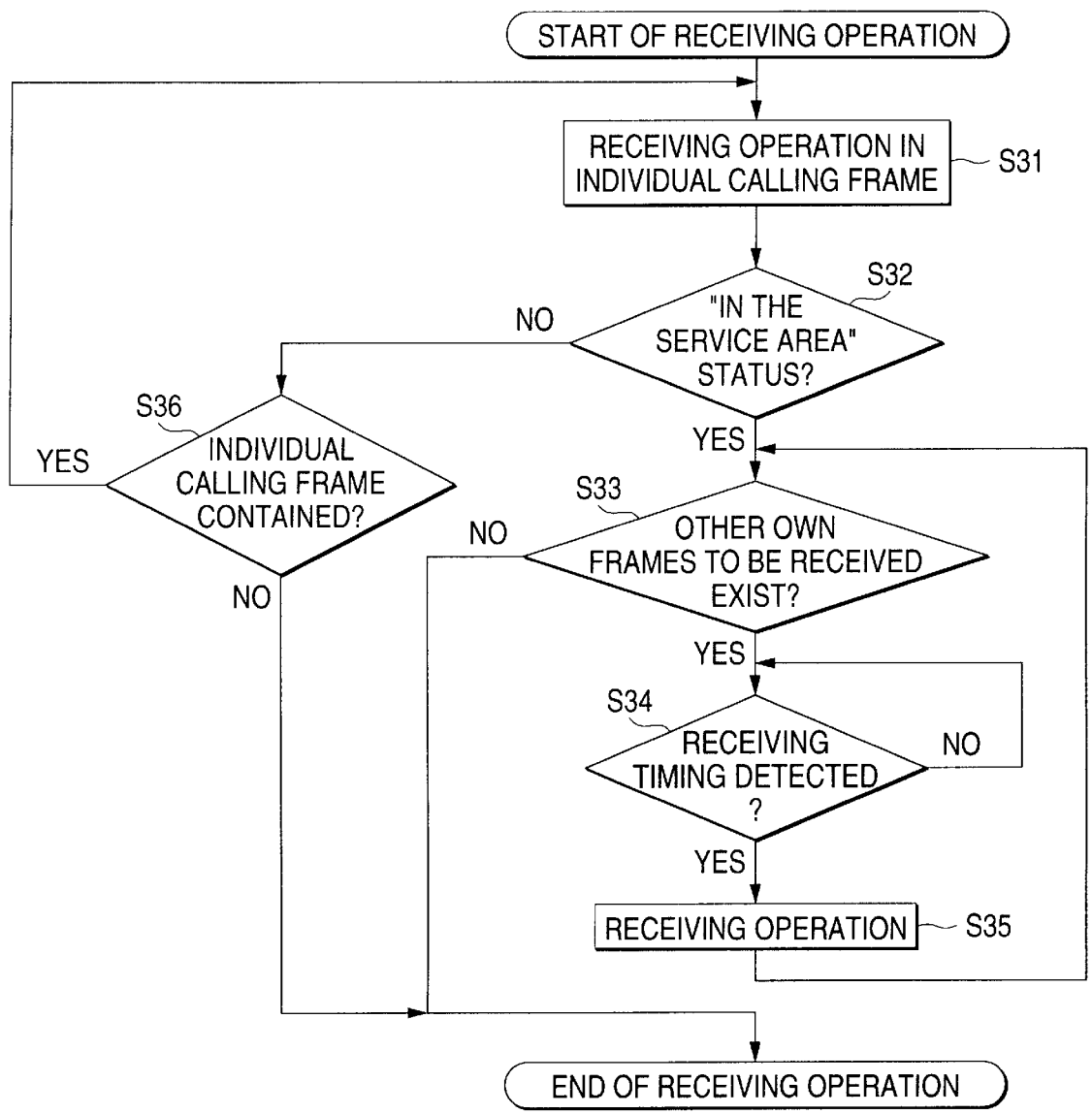
FIG. 3 is a flow chart showing the receiving operation of the radio calling receiver according to the first embodiment of the present invention.

Next, procedures executed in the "in or out of the service area" decision process will be explained with reference to FIG. 3 hereunder. To begin with, the receiving operation is carried out in the individual calling frame (step S31). Then, at the time of the reception of the individual calling frame, based on the received result of the synchronizing signal, it is decided by the receiving state detecting means 4*b* whether or not the radio calling receiver is in or out of the service area of the base station (step S32). If it has been decided that the radio calling receiver is in the service area of the base station, then it is decided whether or not other own frames to be received still exist (step S33). If there has existed other own frames to be received, then the radio calling receiver waits for a receiving timing (a timing at which a signal level is changed from an L level to an H level in the timing chart in FIG. 2) at which the own frame is sent out (step S34). When the radio calling receiver detects the receiving timing (own frame), it carries out the receiving operation (step S35). In contrast, in step S33, if it has been decided that there is no reception of own frame until the succeeding receiving cycle, then the receiving operation in the receiving cycle is terminated. Also, instep S32, if it has been decided by the receiving state detecting means 4*b* that the radio calling receiver is out of the service area of the base station, then it is decided whether or not the individual calling frame is further contained (step S36). That is, in such case, the radio calling receiver carries out no receiving operation other than the individual calling in the receiving cycle. Then, the receiving frame controlling means 4*a* can halt or terminate the receiving operation.

As described above, according to the first embodiment, if the radio calling receiver is out of the service area of the base station, it can be set not to receive unnecessary frames. As a result, because of reduction in the number of receiving frame, power saving or conservation can be attained in the radio calling receiver.

Embodiment 2

Figure 4:
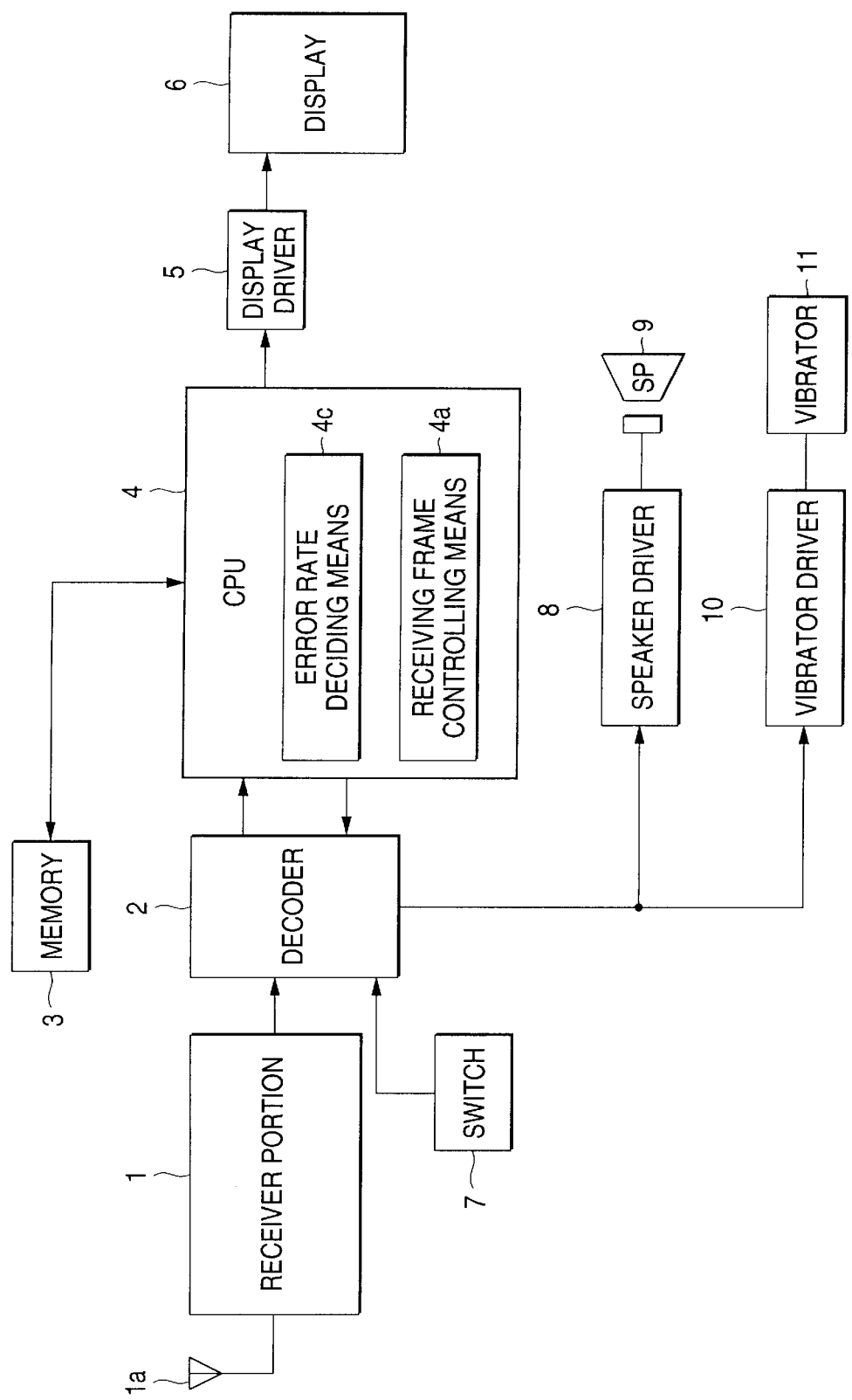
FIG. 4 is a block circuit diagram showing a circuit configuration of a radio calling receiver according to a second embodiment of the present invention.

FIG. 4 is a block circuit diagram showing a circuit configuration of a radio calling receiver according to a second embodiment of the present invention. In FIG. 4, the same reference symbols are affixed to the same constituent elements as those shown in FIG. 1, and thus their redundant explanation will be omitted hereinafter. The second embodiment is different from the first embodiment in that an error rate deciding means 4c is provided in the CPU 4 in place of the receiving state detecting means 4b. The error rate deciding means 4c can decide whether or not an error rate comes up to a certain specified value, by counting the error bit number in the synchronizing signal, or counting either the correction number of BCH (Bose-Chaudhuri-Hocquengham) correction of the frame information and the block information or the number of words which are not subjected to BCH correction in the system which is able to meet the advanced radio calling system standard RCR-STD43A. According to the result of the error rate deciding means 4c, the receiving frame controlling means 4a then executes controls to receive and terminate the receiving frame.

Figure 5:
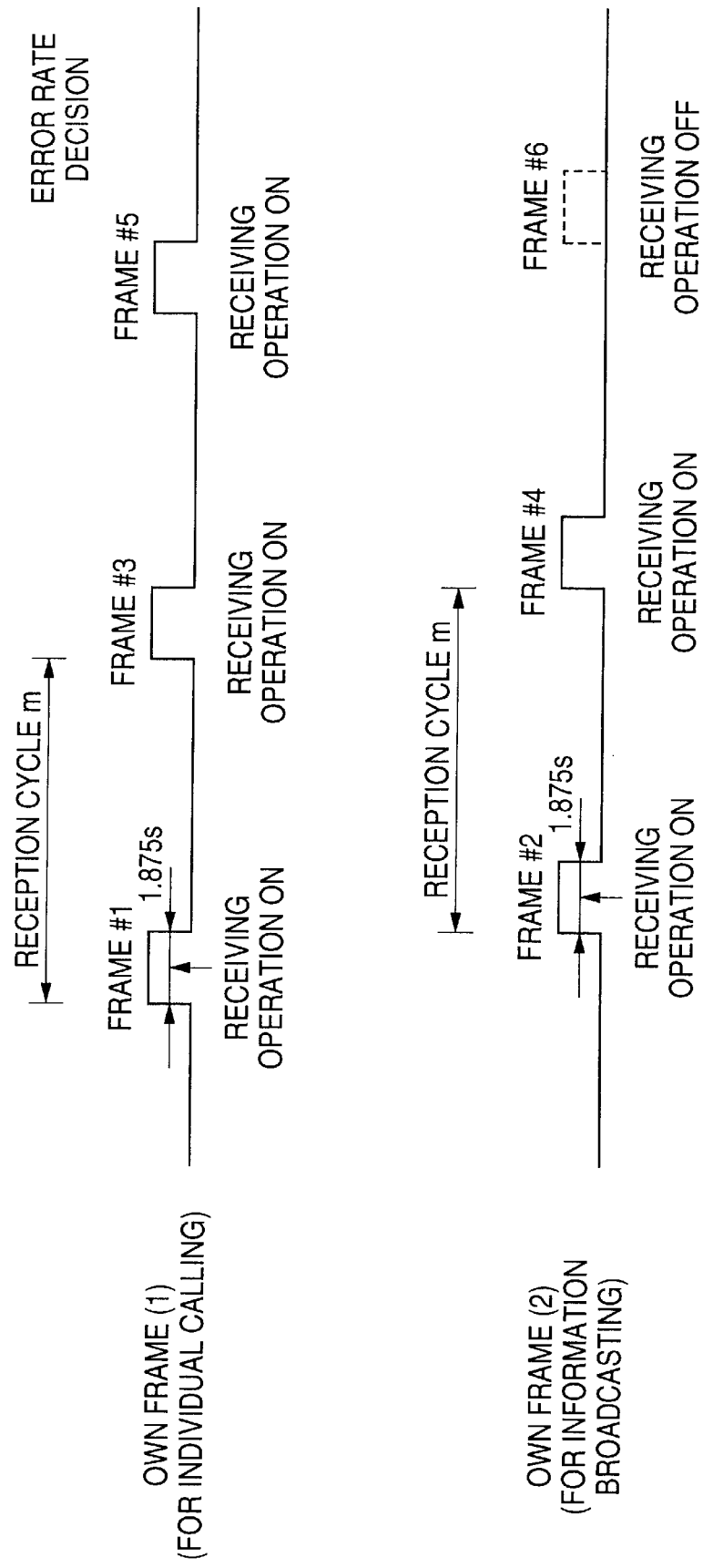
FIG. 5 is a timing chart showing receiving operations of the radio calling receiver according to the second embodiment of the present invention.

FIG. 5 is a timing chart showing receiving operations of the radio calling receiver according to the second embodiment when a plurality of frames are to be received. In FIG. 5, like the case shown in FIG. 2, the case is illustrated where an own frame (1) is used in the receiving operation for individual calling and an own frame (2) is used in the receiving operation for information broadcasting. In FIG. 5, if the radio calling receiver is in the "in the service area" status, it can execute the receiving operations every time in accordance with a series of reception cycles in both the own frame (1) for individual calling and the own frame (2) for information broadcasting, as shown from the frame #1 to the frame #4 in FIG. 5. At the reception of the frame #5 in FIG. 5, if the error rate deciding means 4c shown in FIG. 4 has detected that the error rate is in excess of a predetermined standard, the receiving frame controlling means 4a can halt or terminate the receiving operation, which is normally to be carried out when the error rate is within the predetermined range, of the frame #6 in the own frame (2) in FIG. 5. As a result, the ineffective receiving operation can be prevented to thus achieve power saving or conservation.

Figure 6:
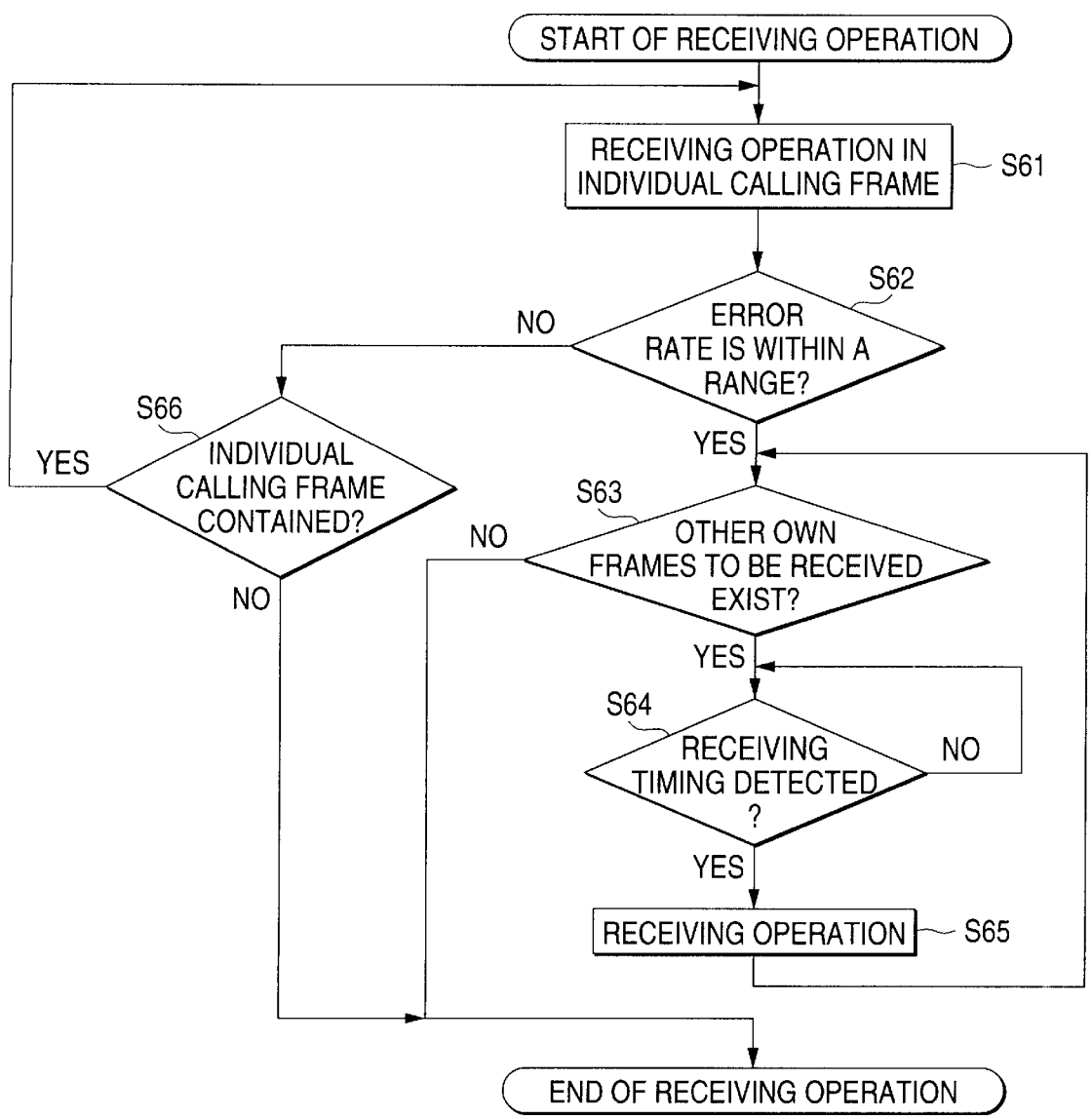
FIG. 6 is a flow chart showing the receiving operation of the radio calling receiver according to the second embodiment of the present invention.

Next, procedures carried out in the error rate decision process will be explained with reference to FIG. 6 hereunder. At first, the receiving operation is carried out in the individual calling frame (step S61). Then, at the time of reception of the individual calling frame, based on the received result of the error bit number in the synchronizing signal or the number of BCH correction of the frame information and the block information, it is decided by the error rate deciding means 4c whether or not the error rate is within the certain range (step S62). If it has been decided that the error rate is within the certain range, then it is decided whether or not other own frames to be received still exist (step S63). Then, if there has existed other own frames to be received, then the radio calling receiver waits for a receiving timing (a timing at which a signal level is changed from an L level to an H level in the timing chart in FIG. 5) at which the own frame is sent out (step S64). When the radio calling receiver detects the receiving timing (own frame), it executes the receiving operation (step S65). In contrast, in step S63, if it has been decided that there is no reception of own frame until the succeeding receiving cycle, the receiving operation in the receiving cycle is terminated. Also, in step S62, if it has been decided by the error rate deciding means 4c that the error rate is in excess of the certain range, then it is decided whether or not the individual calling frame is further contained (step S66). That is, in such case, the radio calling receiver executes no receiving operation other than the individual calling in the receiving cycle. Then, the receiving frame controlling means 4a can halt or terminate the receiving operation.

As described above, according to the second embodiment, if the radio calling receiver is brought into the receiving state in which the error rate is high, it can be set not to receive unnecessary frames. As a result, because of reduction in the number of receiving frame, power saving or conservation can be attained in the radio calling receiver.

Embodiment 3

Figure 7:
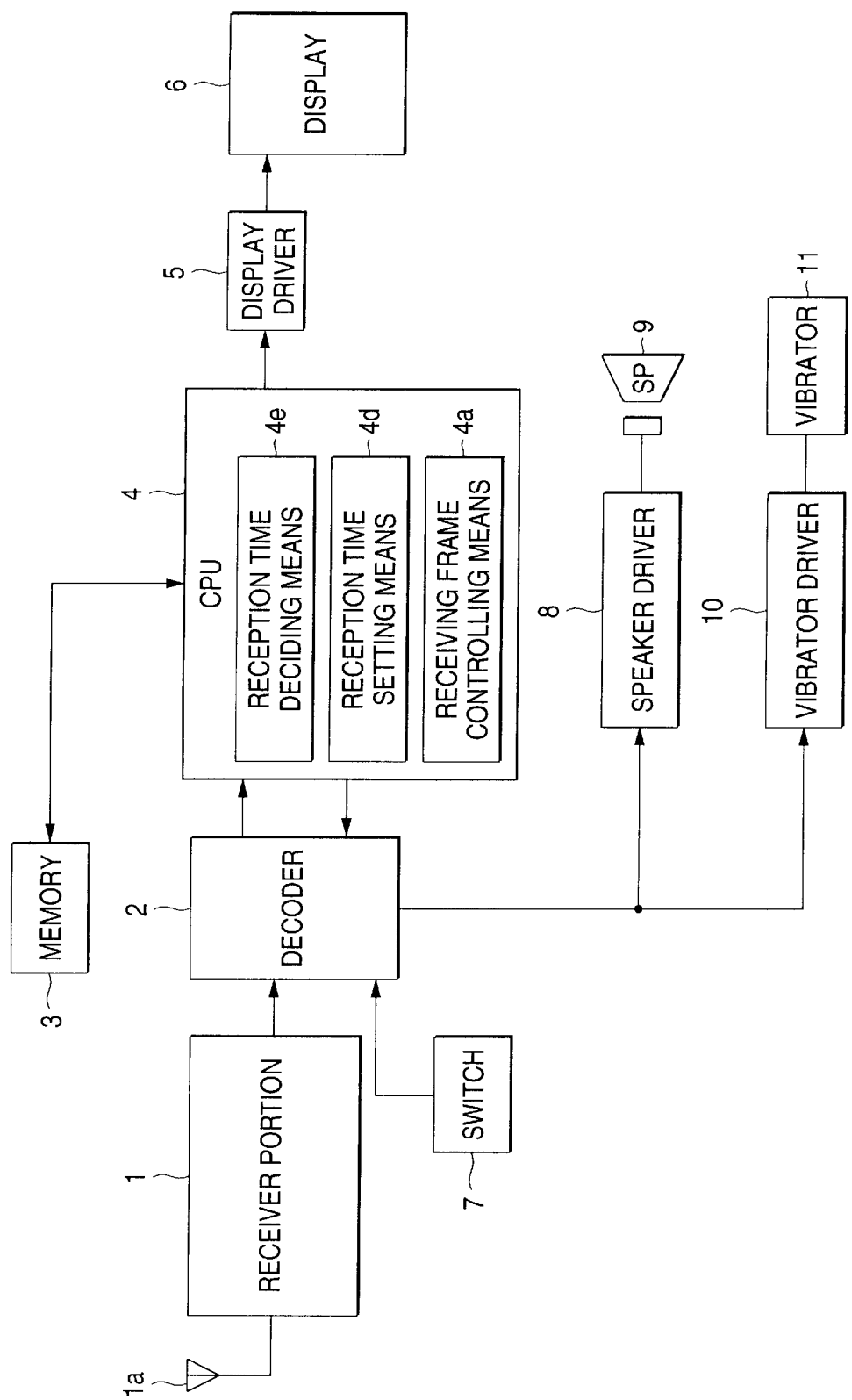
FIG. 7 is a block circuit diagram showing a circuit configuration of a radio calling receiver according to a third embodiment of the present invention.

FIG. 7 is a block circuit diagram showing a circuit configuration of a radio calling receiver according to a third embodiment of the present invention. In FIG. 7, the same reference symbols are assigned to the same constituent elements as those shown in FIG. 1, and thus their redundant explanation will be omitted hereinafter. The third embodiment differs from the first embodiment in that a reception time setting means 4d and a reception time deciding means 4e are provided in the CPU 4 in place of the receiving state detecting means 4b. The reception time setting means 4d can be used by the user via the switch 7 to set a time zone during when data reception of the information broadcasting such as news distribution to the own address from the base station is suspended. The reception time deciding means 4e can monitor that a current time belongs to the time zone which is set by the reception time setting means 4d, and then notify the receiving frame controlling means 4a of the monitored result. Then, the receiving frame controlling means 4a can receive the notification issued from the reception time deciding means 4e, and then control to terminate the frame reception of the information broadcasting for the own address if the current time enters into the set time zone.

Figure 8:
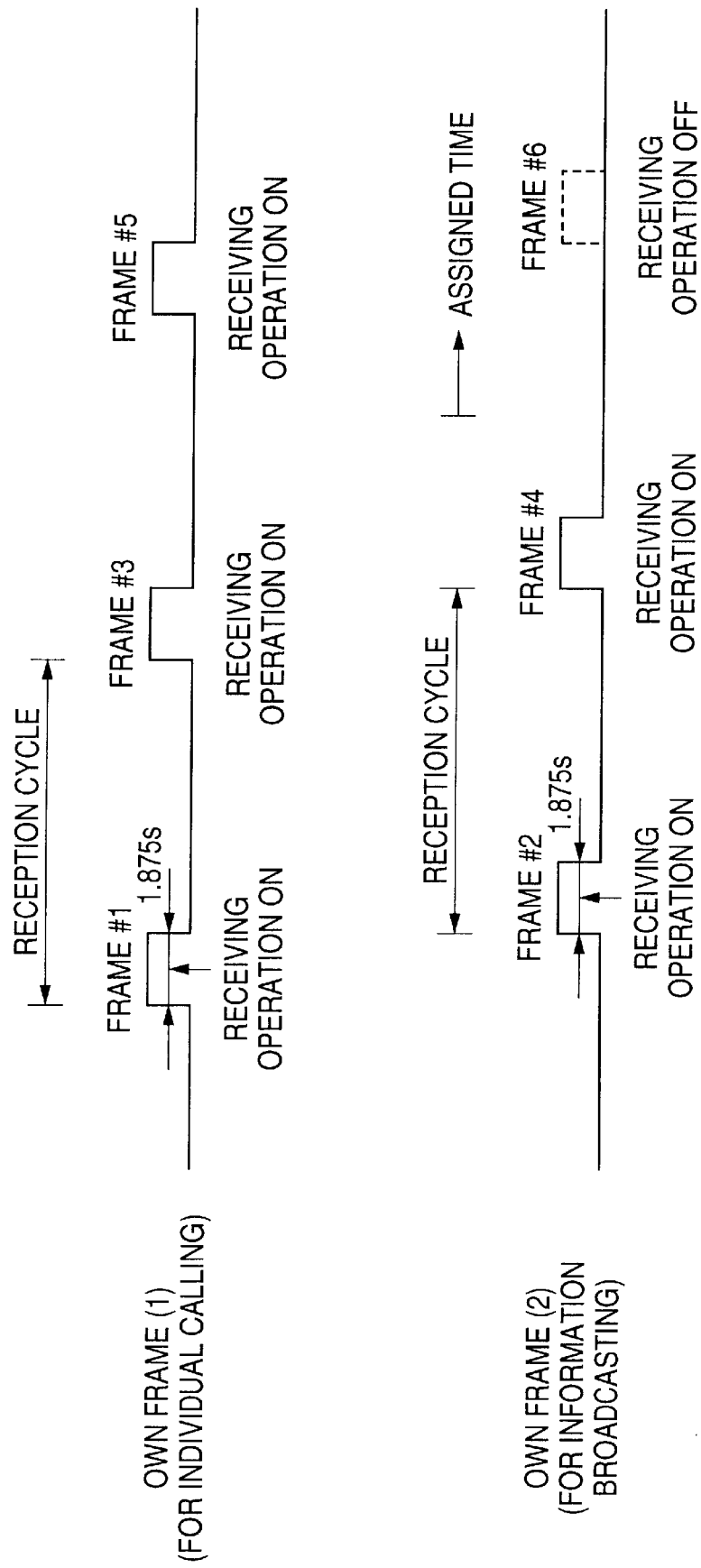
FIG. 8 is a timing chart showing receiving operations of the radio calling receiver according to the third embodiment of the present invention.

FIG. 8 is a timing chart showing a receiving operation of the radio calling receiver according to the third embodiment when a plurality of frames are to be received. In FIG. 8, as in the case shown in FIG. 2, the case is illustrated where an own frame (1) is used in the receiving operation for individual calling and an own frame (2) is used in the receiving operation for information broadcasting. In FIG. 8, if the radio calling receiver is in the "in the service area" status, it can execute the receiving operations every time in accordance with a series of reception cycles in both the own frame (1) for individual calling and the own frame (2) for information broadcasting, as shown from the frame #1 to the frame #4 in FIG. 8. At the reception after the frame #4 in FIG. 8, if the reception time belongs to the reception halt time zone which has been set by the reception time setting means 4d, then the radio calling receiver merely receives the frame #5 in the own frame (1) in FIG. 8. In this case, if it is decided by the reception time deciding means 4e that the own frame (2) has entered into the reception halt time zone, the receiving frame controlling means 4a can halt or terminate the receiving operation, which is normally to be carried out, of the frame #6 in the own frame (2) in FIG. 8. As a result, the ineffective receiving operation can be omitted to thus attain power saving or conservation.

Figure 9:
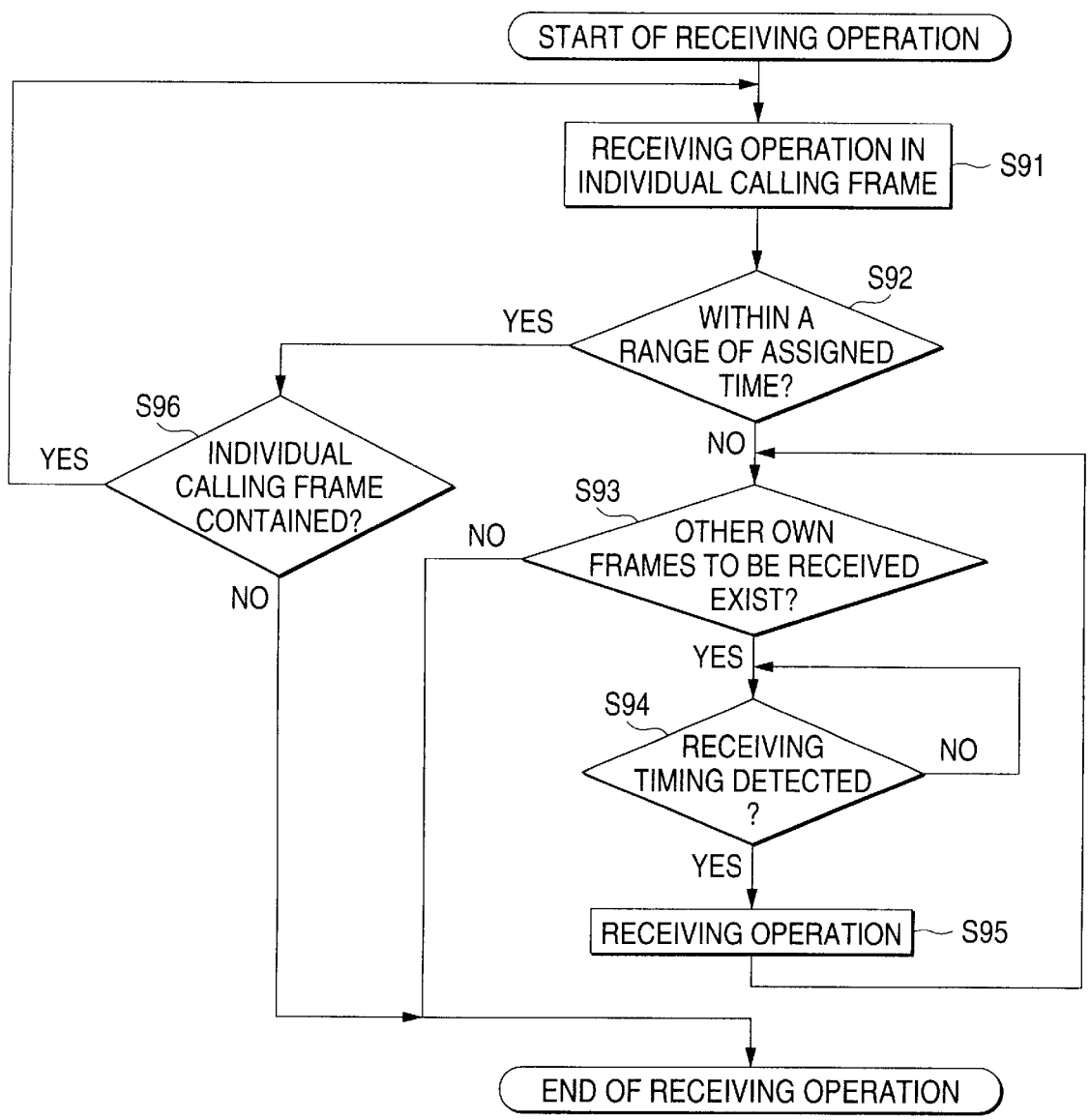
FIG. 9 is a flow chart showing the receiving operation of the radio calling receiver according to the third embodiment of the present invention.

Next, procedures carried out in the reception time decision process will be explained with reference to FIG. 9 hereunder. At first, the receiving operation is carried out in the individual calling frame (step S91). Then, it is decided by the reception time deciding means 4e whether or not the current time is in the time zone which has been set by the reception time setting means 4d (step S92). If it has been decided that the current time belongs to the reception halt time zone being set, then it is decided whether or not other own frames to be received still exist (step S93). If there has existed other own frames to be received, the radio calling receiver waits for a receiving timing (a timing at which a signal level is changed from an L level to an H level in the timing chart in FIG. 8) at which the own frame is sent out (step S94). When the radio calling receiver detects the receiving timing (own frame), it executes the receiving operation (step S95). On the contrary, in step S93, if it has been decided that there is no reception of own frame until the succeeding receiving cycle, the receiving operation in the receiving cycle is terminated. Also, in step S92, if it has been decided by the reception time deciding means 4e that the current time is out of the reception halt time zone (step S96). That is, in this case, the radio calling receiver executes no receiving operation other than the individual calling in the receiving cycle. Then, the receiving frame controlling means 4a can halt or terminate the receiving operation.

As described above, according to the third embodiment, since the radio calling receiver can be set not to receive unnecessary frames in the time zone such as a nighttime during when the information broadcasting is not effected in service, power saving or conservation can be attained in the radio calling receiver because of reduction in the number of receiving frame.

Embodiment 4

Figure 10:
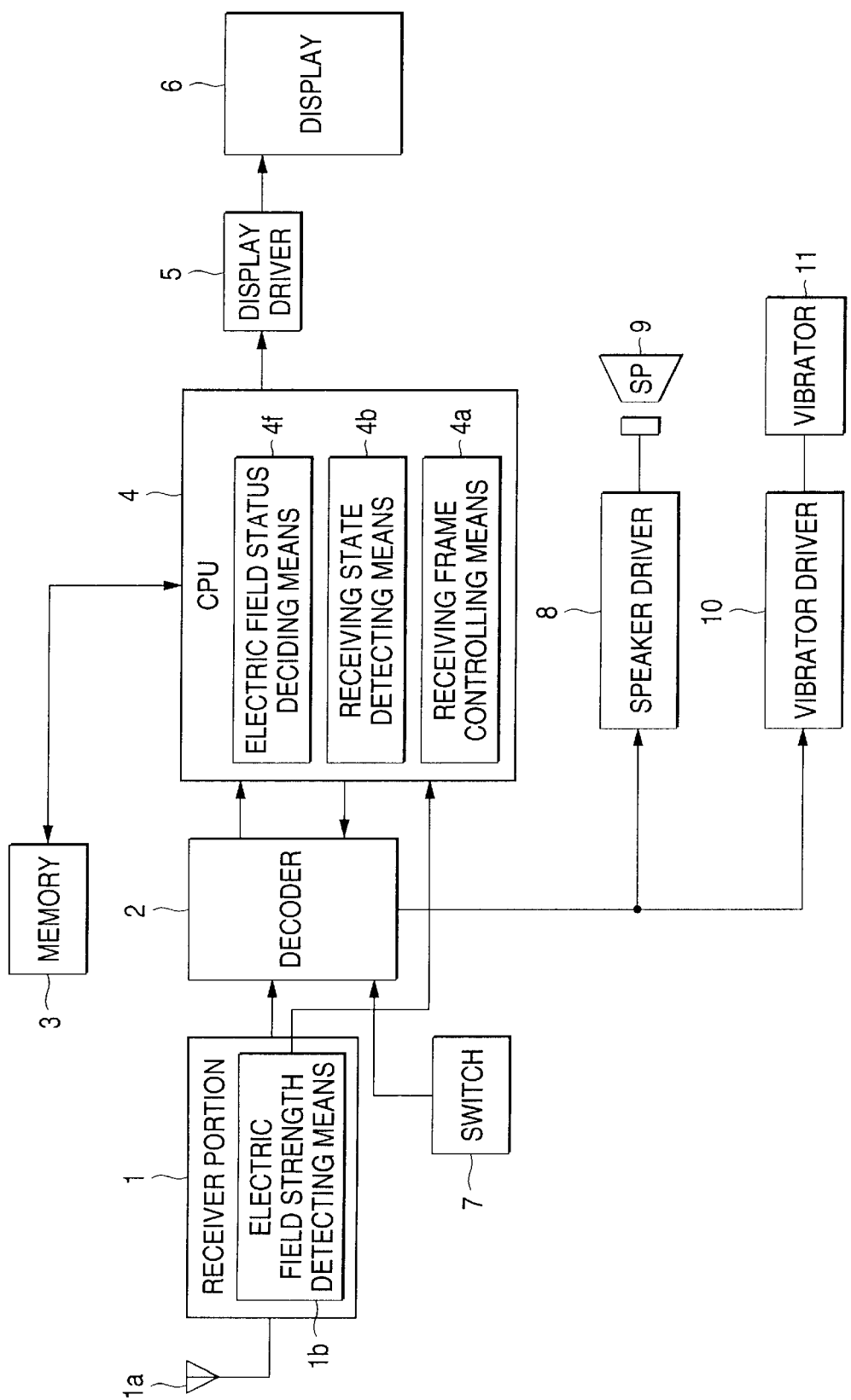
FIG. 10 is a block circuit diagram showing a circuit configuration of a radio calling receiver according to a fourth embodiment of the present invention.

FIG. 10 is a block circuit diagram showing a circuit configuration of a radio calling receiver according to a fourth embodiment of the present invention. In FIG. 10, the same reference symbols are labeled to the same constituent elements as those shown in FIG. 1, and thus their redundant explanation will be omitted hereinafter. A difference of the fourth embodiment from the first embodiment resides in that an electric field strength detecting means 1b is provided in the receiver portion 1 and also an electric field status deciding means 4f is provided in the CPU 4. The electric field strength detecting means 1b detects strength of the electric field of the received signal with a certain frequency. The electric field status deciding means 4f receives the signal from the electric field strength detecting means 1b and then decides whether or not an electric field value is in excess of a predetermined value. In compliance with the states of the receiving state detecting means 4b and the electric field status deciding means 4f, the receiving frame controlling means 4a executes a standby receiving operation as the normal receiving operation and a short-time standby receiving operation used only to monitor and detect the electric field.

Figure 11:
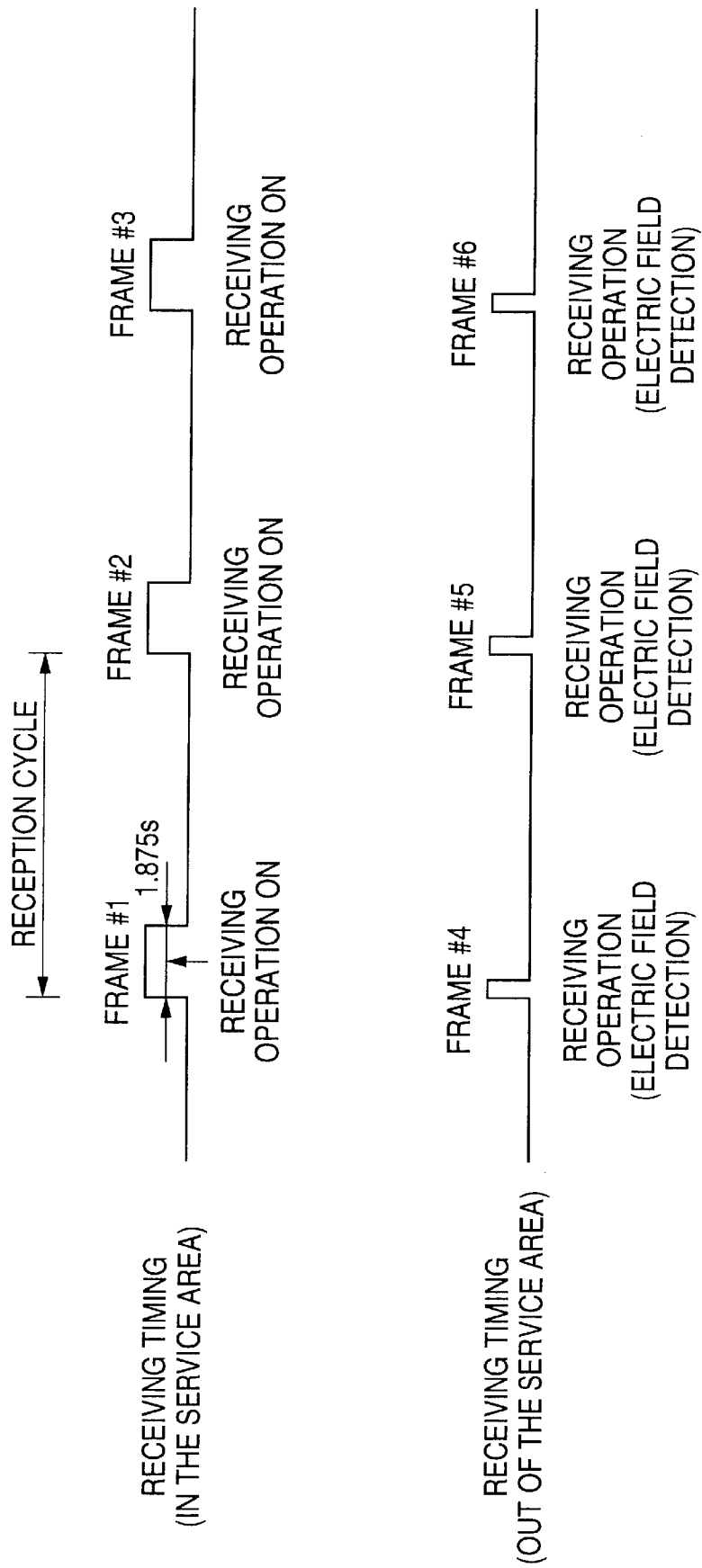
FIG. 11 is a timing chart showing receiving operations of the radio calling receiver according to the fourth embodiment of the present invention.

FIG. 11 is a timing chart showing receiving operations of the radio calling receiver according to the fourth embodiment of the present invention. In FIG. 11, if the radio calling receiver is in the "in the service area" status, it can execute the receiving operations every time in accordance with a series of reception cycles in the own frame, as shown from the frame #1 to the frame #3 in FIG. 11. However, if it is decided by the receiving state detecting means 4b that the radio calling receiver is in the "out of the service area" status, then the electric field strength is detected by the electric field strength detecting means 1b, as shown from the frame #4 to the frame #6 in FIG. 11. At that time, if it is decided by the electric field status deciding means 4f that the electric field strength is less than a predetermined value, then the reception operation for monitoring only the electric field strength, which is shorter in time than the normal standby operation, is performed. In this manner, if the radio calling receiver is in the "out of the service area" status and also the electric field strength is low, it executes the short-time standby receiving operation to monitor only the electric field status. As a result, a consumed time in the receiving operation can be shortened to thus achieve power saving or conservation.

Figure 12:
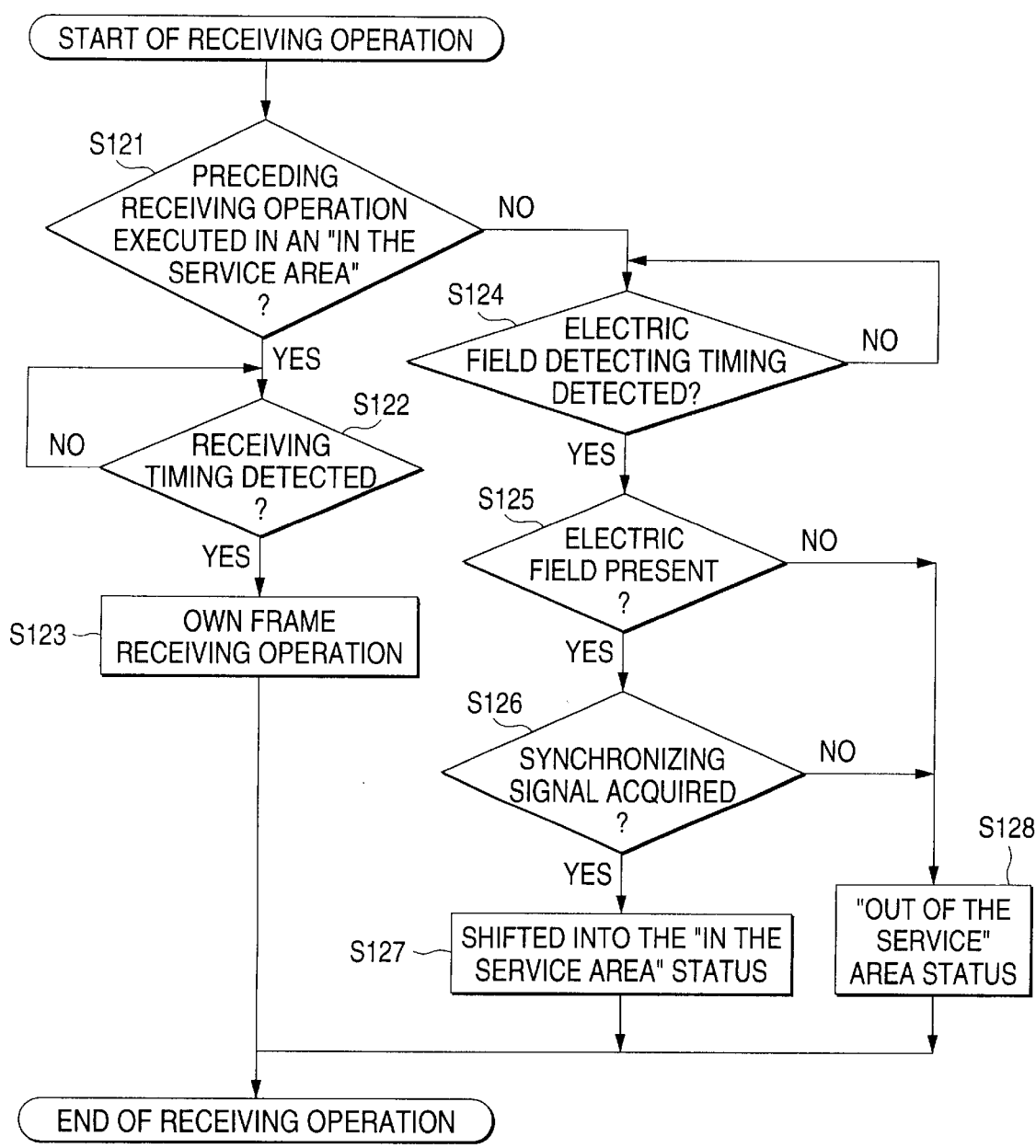
FIG. 12 is a flow chart showing the receiving operation of the radio calling receiver according to the fourth embodiment of the present invention.
Figure 13:
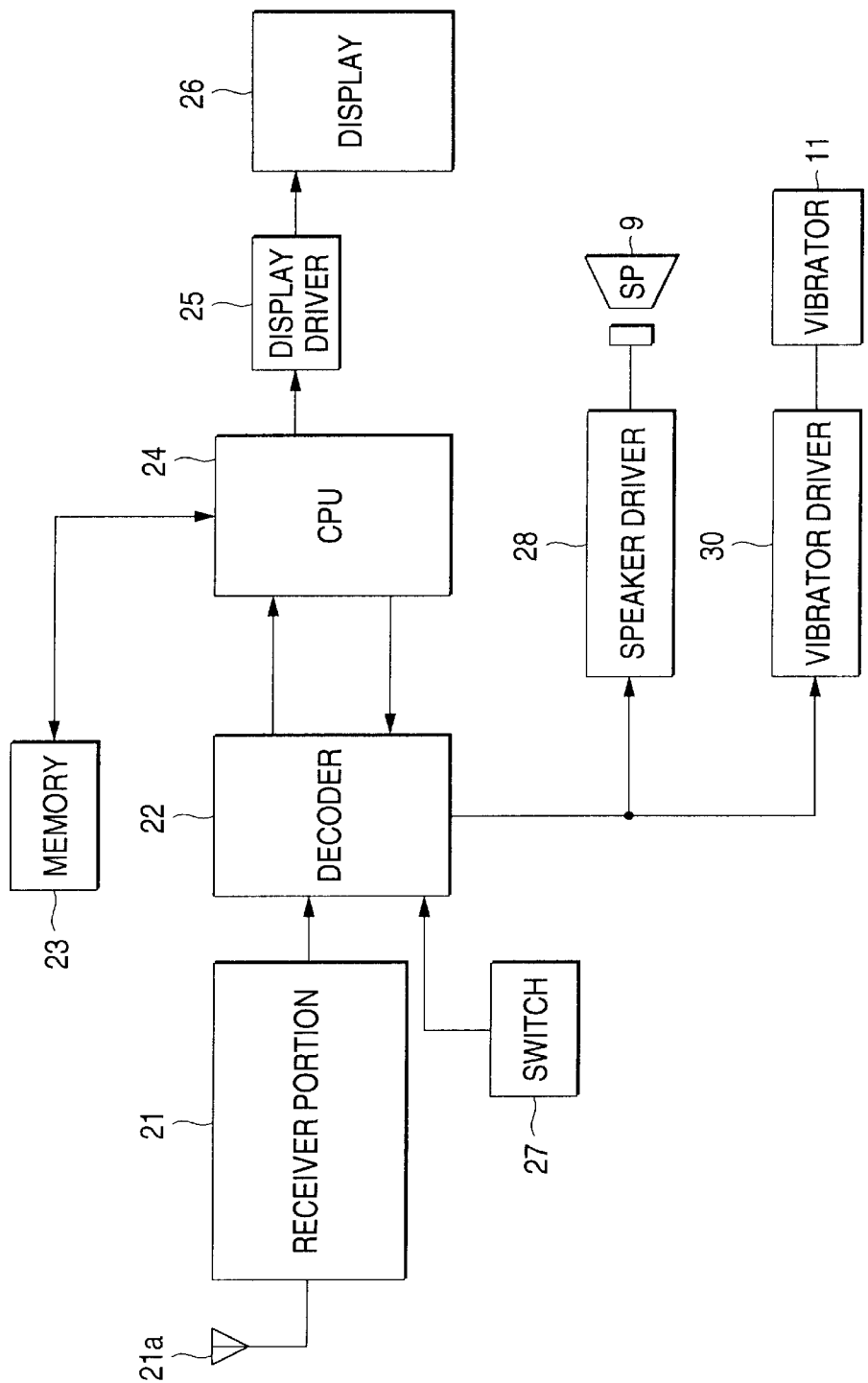
FIG. 13 is a block circuit diagram showing a circuit configuration of a radio calling receiver in the prior art.

Then, procedures carried out in the electric field strength detection process will be explained with reference to FIG. 12 hereunder. To begin with, it is decided whether or not the preceding receiving operation is executed in or out of the service area (step S121). If it has been decided that the preceding receiving operation is executed in the service area, the radio calling receiver waits for a receiving timing (a timing at which a signal level is changed from an L level to an H level in the timing chart in FIG. 11) at which the own frame is sent out (step S122). When the radio calling receiver detects the receiving timing (own frame) by the receiving frame controlling means 4a, it carries out the receiving operation (step S123). In above step S121, if it has been decided by the receiving state detecting means 4b that the preceding receiving operation is executed out of the service area, the radio calling receiver waits for an electric field detecting timing (timings #4 to #6 at which a signal level is changed from an L level to an H level in the timing chart in FIG. 11) in compliance with the reception cycle (step S124). When the electric field detecting timing has detected, then it is decided by the electric field in strength detecting means 1b and the electric field status deciding means 4f whether or not the electric field is present (step S125). Then, if it has been decided by the electric field status deciding means 4f that the electric field strength exceeds the predetermined value, the radio calling receiver executes the receiving operation to acquire the normal synchronizing signal under the control of the receiving frame controlling means 4a (step S126). Then, if the synchronizing signal can be acquired, the radio calling receiver is shifted into "in the service area" status (step S127). While, unless the synchronizing signal can be acquired, the radio calling receiver is held in the "out of the service area" status as it is by the receiving state detecting means 4b (step S128). In contrast, in step S125, if it has been decided by the electric field status deciding means 4f that the electric field strength is less than the predetermined value, the radio calling receiver is held in the "out of the service area" status as it is (step S128).

As described above, according to the fourth embodiment, if the radio calling receiver is out of the service area of the base station and also the electric field strength is low, the radio calling receiver executes the standby receiving operation, which is shorter in time than the normal receiving operation, to monitor only the electric field level. As a result, the receiving time can be shortened to thus achieve power saving or conservation.

The radio calling receiver of the present invention may be constructed to comprise all the receiving frame controlling means 4a and the receiving state detecting means 4b set forth in the first embodiment, the error rate deciding means 4c set forth in the second embodiment, the reception time setting means 4d and the reception time deciding means 4e set forth in the third embodiment, and the electric field strength detecting means 1b and the electric field status deciding means 4f set forth in the fourth embodiment. Otherwise, the radio calling receiver of the present invention may be constructed to comprise the above means in selective combination.

As described above, according to the present invention, in the radio calling receiver which is able to receive radio signals transmitted to a plurality of own addresses as a plurality of different own frames respectively, there are provided a receiving frame controlling means for controlling individually receiving operations of a plurality of frames, and a receiving state detecting means for detecting whether or not a receiving state is in or out of a service area of the base station, wherein receiving operations can be controlled every frame according to whether or not the receiving state is in or out of the service area of the base station. As a result, the present invention has such an advantage that the power saving or conservation can be achieved when the receiving state is out of the service area of the base station.

Further, according to the present invention, there are provided a receiving frame controlling means for controlling individually receiving operations of a plurality of frames, and an error rate deciding means for deciding an error rate of the radio signals, wherein the receiving operations per frame can be controlled according to whether or not the error rate has exceeded a certain reference value. As a result, the present invention has such an advantage that the power saving or conservation can be achieved in the areas wherein the receiving state is poor.

Furthermore, according to the present invention, there are provided a receiving frame controlling means for controlling individually receiving operations of a plurality of frames, a receiving time setting means for setting an operation halting time zone of receiving frames corresponding to addresses designated by a user, and a receiving time deciding means for deciding whether or not a current time enters into the operation halting time zone, wherein receiving operations can be controlled according to whether or not in all own frames corresponding to the plurality of own addresses can the current time belongs to the operation halting time zone being set. As a result, the present invention has such an advantage that the power saving or conservation can be achieved in a normally available mode by not-receiving particular information broadcasting frames in the time zone being set.

Moreover, according to the present invention, there are provided a receiving frame controlling means for controlling individually receiving operations of a plurality of frames, a receiving state detecting means for detecting whether or not a receiving state is in or out of a service area of the base station, an electric field strength detecting means for detecting an electric field value of a predetermined frequency to be received, and an electric field state deciding means for deciding an electric field state of the predetermined frequency to be received. As a result, the present invention has such an advantage that, if the receiving state is out of a service area of the base station and also the electric field strength is low, the power saving or conservation can be achieved by executing the short-time standby operation to monitor only the electric field state when the receiving state is out of a service area of the base station.

What is claimed is:

1. A radio calling receiver comprising:
receiving means for receiving radio signals transmitted to a plurality of own addresses from a base station of a radio calling system as a plurality of different own frames, respectively;
decoding means for fetching one or a plurality of own addresses from the radio signals received and then fetching message data corresponding to the own addresses;
receiving frame controlling means for controlling receiving operations of a plurality of frames individually; and
receiving state detecting means for detecting whether a receiving state is in or out of a service area of the base station;
wherein receiving operations in all own frames corresponding to the plurality of own addresses are executed if the receiving state is in the service area, and receiving operations only in own frames corresponding to individual calling addresses are executed if the receiving state is out of the service area, and wherein reception of own frames such as information broadcasting frames, which need a low real-time response is halted.

2. A radio calling receiver comprising:
receiving means for receiving radio signals transmitted to a plurality of own addresses from a base station of a radio calling system as a plurality of different own frames, respectively;
decoding means for fetching one or a plurality of own addresses from the radio signals received and then fetching message data corresponding to the own addresses;
receiving frame controlling means for controlling receiving operations of a plurality of frames individually; and
error rate deciding means for deciding an error rate of the radio signals;
wherein receiving operations in all own frames corresponding to the plurality of own addresses are executed if the error rate is within a certain range, and wherein receiving operations only in own frames corresponding to individual calling addresses are executed if the error rate exceeds said certain range, and wherein reception of own frames, such as information broadcasting frames, which need a low real-time response is halted.

3. A radio calling receiver comprising:
receiving means for receiving radio signals transmitted to a plurality of own addresses from a base station of a radio calling system as a plurality of different own frames, respectively;
decoding means for fetching one or a plurality of own addresses from the radio signals received and then fetching message data corresponding to the own addresses;
receiving frame controlling means for controlling receiving operations of a plurality of frames individually;
receiving time setting means for setting an operation halting time zone of receiving frames corresponding to addresses designated by a user; and
receiving time deciding means for deciding whether current time enters into the operation halting time zone;
wherein receiving operations in all own frames corresponding to the plurality of own addresses are executed in a usually available mode, and reception of own frames corresponding to designated addresses is halted if the current time belongs to the operation halting time zone being set.

4. A radio calling receiver comprising:
receiving means for receiving radio signals transmitted to a plurality of own addresses from a base station of a radio calling system as a plurality of different own frames, respectively;
decoding means for fetching one or a plurality of own addresses from the radio signals received and then fetching message data corresponding to the own addresses;
receiving frame controlling means for controlling receiving operations of a plurality of frames individually;
receiving state detecting means for detecting whether a receiving state is in or out of a service area of the base station;

electric field strength detecting means for detecting an electric field value of a predetermined frequency to be received; and electric field state deciding means for deciding an electric field state of the predetermined frequency to be received;

wherein an electric field is detected by the electric field strength detecting means if it has been decided by the receiving state detecting means that the receiving state is out of the service area of the base station, and wherein a standby operation, which is shorter in time than a normal standby operation, is performed if it has been decided by the electric field state deciding means that the electric field strength is less than a certain value.

5. A radio calling receiver as claimed in claim 1, further comprising:

receiving time setting means for setting an operation halting time zone of the receiving frames corresponding to addresses designated by a user; and receiving time deciding means for deciding whether a current time enters into the operation halting time zone being set;

wherein reception of the own frames corresponding to designated addresses is halted regardless of the in or out of the service area status if the current time belongs to the operation halting time zone set by the receiving time setting means.

6. A radio calling receiver as claimed in claim 2, further comprising:

receiving time setting means for setting an operation halting time zone of the receiving frames corresponding to addresses designated by a user; and receiving time deciding means for deciding whether a current time enters into the operation halting time zone being set;

wherein reception of the own frames corresponding to designated addresses is halted regardless of the error rate if the current time belongs to the operation halting time zone set by the receiving time setting means.

7. A radio calling receiver as claimed in claim 4, further comprising:

receiving time setting means for setting an operation halting time zone of the receiving frames corresponding to addresses designated by a user;

receiving time deciding means for deciding whether a current time enters into the operation halting time zone being set;

wherein reception of the own frames corresponding to designated addresses is halted regardless of the in or out of the service area status if the current time belongs to the operation halting time zone set by the receiving time setting means.

* * * * *